United States Patent
Yoshida et al.

(10) Patent No.: US 8,181,486 B2
(45) Date of Patent: May 22, 2012

(54) METHODS FOR MANUFACTURING PERFORMS FOR PRESS MOLDING AND METHOD FOR MANUFACTURING OPTICAL ELEMENTS

(75) Inventors: Masahiro Yoshida, Hidaka (JP); Yoshikane Shinkuma, Tachikawa (JP); Katsumi Utsugi, Tachikawa (JP)

(73) Assignee: Hoya Corporation, Tokyo (JP)

( * ) Notice: Subject to any disclaimer, the term of this patent is extended or adjusted under 35 U.S.C. 154(b) by 649 days.

(21) Appl. No.: 11/362,798

(22) Filed: Feb. 28, 2006

(65) Prior Publication Data
US 2006/0260361 A1 Nov. 23, 2006

(30) Foreign Application Priority Data
Feb. 28, 2005 (JP) ................................. 2005-054326

(51) Int. Cl.
*C03B 17/00* (2006.01)
(52) U.S. Cl. ............................... 65/127; 65/128; 65/129
(58) Field of Classification Search ............ 65/122–132, 65/207–209, 25.1, 65–68
See application file for complete search history.

(56) References Cited

U.S. PATENT DOCUMENTS

2003/0000252 A1* 1/2003 Yoshikuni et al. ................. 65/61
2003/0051508 A1* 3/2003 Uezaki et al. ..................... 65/66
2003/0100433 A1* 5/2003 Hayashi et al. .................. 501/79
2004/0261454 A1* 12/2004 Yoshida et al. ................. 65/21.3
2006/0283209 A1* 12/2006 Yoshida ............................. 65/66

FOREIGN PATENT DOCUMENTS

| CN | 1576247 A | 2/2005 |
|----|-----------|--------|
| JP | 2000007360 A | 1/2000 |
| JP | 2004284847 A | 10/2004 |
| JP | 2005015300 A | 1/2005 |
| JP | 2005015301 A | 1/2005 |

OTHER PUBLICATIONS

Chinese Office Action dated Jul. 10, 2009.
Japanese Office Action dated Jan. 27, 2009.
Japanese Office Action corresponding to Japanese Patent Application No. 2009-082076, mailed May 17, 2011.

* cited by examiner

*Primary Examiner* — Matthew Daniels
*Assistant Examiner* — Jodi C Franklin
(74) *Attorney, Agent, or Firm* — Sughrue Mion, PLLC (57) ABSTRACT

In the method for manufacturing preforms for press molding, a glass melt gob is separated from glass melt flow flowing out of a pipe and the glass melt gob is molded into a preform for press molding on a glass gob casting mold. The method comprises a viscosity-increasing step to increase viscosity of the glass melt.

16 Claims, 4 Drawing Sheets

METHODS FOR MANUFACTURING PERFORMS FOR PRESS MOLDING AND METHOD FOR MANUFACTURING OPTICAL ELEMENTS

CROSS-REFERENCE TO RELATED APPLICATIONS

This application claims benefit of priority under 35 USC 119 to Japanese Patent Application No. 2005-054326 filed on Feb. 28, 2005.

TECHNICAL FIELD

The present invention relates to a method for manufacturing preforms for press molding and to a method for manufacturing optical elements in which the preforms produced by the above method are precision press molded.

With the widespread popularity of digital cameras, cellular phones with cameras, and the like, the demand for aspherical lenses and small lenses is increasing. Precision press molding, also known as mold optics molding, has attracted attention as a highly efficient method of manufacturing such glass optical elements. In this method, a premolded glass product called a preform is prepared, the preform is heated and press molded to form the overall shape of the optical element, and the molding surface of the pressing mold is precisely transferred to the glass to form an optically functional surface such as a lens surface without grinding or polishing.

In precision press molding, in addition to enhancing the productivity of the precision press-molding process, there is also the problem of manufacturing the preform with high productivity. Methods such as the method of directly molding preforms from a glass melt (known as the "hot molding method") disclosed in Japanese Unexamined Patent Publication (KOKAI) No. 2003-40632 (Reference 1) are known to solve this problem.

In the method disclosed in Reference 1, the glass is molded while being subjected to upward wind pressure to prevent the occurrence of preform surface wrinkling as well as flaws and crack while preventing hot fusion of the glass and the preform casting mold used to mold the glass.

In precision press molding, great effort is expended to lower the transition temperature and yield point of the glass employed so as to lower the press molding temperature to prevent deterioration of expensive pressing molds. Further, in recent years, a high refractive index has come to be required of the glass employed in optical elements.

When attempting to achieve a high refractive index without losing the low-temperature softening property of the glass, the quantity of components imparting a low-temperature softening property and imparting a high refractive index must be relatively increased. As a result, the quantity of glass-network-forming component becomes relatively low, diminishing resistance to devitrification (raising the devitrification temperature) of the glass in the high temperature region. Since the glass devitrifies when the glass melt is caused to flow out at a temperature not exceeding the devitrification temperature range, the flow temperature must be raised for glass with such low resistance to devitrification and such a high devitrification temperature range, and the viscosity of the glass when flowing out drops sharply. However, there are problems in that when hot molding is conducted with such glass, glass in a state of low viscosity folds in on itself, entraining gas, incorporating bubbles into the interior, and precluding use of the glass as a preform.

When manufacturing lenses by precision press molding, the preform must be accurately introduced into the center of the molding surface of the lower mold of the pressing mold. Most lenses employed in digital cameras and the like are of relatively large volume and have highly curved surfaces, so the curvature of the lower mold surface is great. To properly introduce a preform onto such a lower mold, it is effective to employ a preform of spherical shape and stably position the preform at the center of the molding surface of the lower mold. To this end, there is need for a technique of directly and stably casting spherical preforms of comparatively large volume directly from glass melt having low viscosity when flowing out.

The present invention, devised to solve the above-stated problems, has for its object to provide a method for mass producing high-quality preforms for press molding with high productivity from glass melt, and a method for manufacturing optical elements by precision press molding the preforms manufactured by the above method.

DESCRIPTION OF THE INVENTION

The first aspect of the present invention relates to a method for manufacturing preforms for press molding in which a glass melt gob is separated from glass melt flow flowing out of a pipe and said glass melt gob is molded into a preform for press molding on a glass gob casting mold, comprising the steps of:

receiving a front end of said glass melt flow on a supporting member positioned beneath said pipe, dropping said supporting member downward to separate a glass melt gob from said glass melt flow, and transferring said glass melt gob onto the glass gob casting mold to conduct a molding step, wherein during a period from when the front end of said glass melt flow is received with the supporting member in said receiving step to when said glass melt gob is transferred onto the glass gob casting mold in said transferring step, said glass melt is supported in a state of contact with said supporting member and heat of said glass melt is removed with thermal conduction to increase viscosity of said glass melt in a viscosity-increasing step, and following increasing viscosity said glass melt, an operation in which said glass melt is floated on said supporting member is conducted.

In the first aspect, gas can be blown from a surface of said supporting member to float said glass melt gob.

In the first aspect, said supporting member can be comprised of multiple dividing members capable of separating and joining together in a cross direction;

with said dividing members in a joined state, the glass melt supported can be held for a prescribed period in a state of contact with a surface of said supporting member; and gas can be then blown from at least a portion of the surface of said supporting member to float said glass gob, after which said dividing members are separated from each other to drop said glass gob vertically to transfer said glass gob onto said casting mold.

The second aspect of the present invention relates to a method for manufacturing preforms for press molding comprising a separating step in which a glass melt gob is separated from a front end of glass melt flow flowing out of a pipe and a molding step in which said glass melt gob is molded into a preform for press molding on a glass gob casting mold, wherein said separating step is conducted by supporting the front end of said glass melt flow with a first supporting member positioned beneath said pipe, and then a glass melt gob is separated from the glass melt flow by dropping said first supporting member downward or removing support with said first supporting member;

said glass melt gob separated in said separating step is transferred onto a second supporting member and held for a prescribed period to increase viscosity of said glass melt gob in a viscosity-increasing step; and following said viscosity-increasing step, said glass gob is transferred from said second supporting member onto said casting mold.

In the second aspect, said viscosity-increasing step can be conducted on said second supporting member while floating said glass melt gob.

In the second aspect, said first supporting member can be comprised of multiple dividing members capable of separating and joining together in a cross direction;

with said dividing members in a joined state, the glass melt gob can be held for a prescribed period on a surface of said first supporting member; and gas can be then blown from at least a portion of the surface of said supporting member to float said glass gob, after which said dividing members are separated from each other to drop said glass gob vertically to transfer said glass gob onto said second supporting member.

In the second aspect, said separating step can be conducted by receiving the front end of said glass melt flow on said first supporting member and then dropping said first supporting member downward to separate the glass melt gob from the glass melt flow In the second aspect, said first supporting member can be comprised of multiple dividing members capable of separating and joining together in a cross direction; and said separating step can be conducted by receiving the front end of said glass melt flow on a surface of said first supporting member with said dividing members in a joined state and then separating said dividing members each other to separate the glass melt gob from the glass melt flow.

The third aspect of the present invention relates to a method for manufacturing preforms for press molding comprising a separating step in which a glass melt gob is separated from a front end of glass melt flow flowing out of a pipe and a molding step in which said glass melt gob is molded into a preform for press molding on a glass gob casting mold, wherein said separating step is conducted by supporting the front end of said glass melt flow with a supporting member positioned beneath said pipe, and then the glass melt gob is separated from the glass melt flow by dropping said supporting member downward;

said glass melt gob separated is held for a prescribed period on said supporting member to increase viscosity of said glass melt gob in a viscosity-increasing step;

multiple supporting members are sequentially employed to conduct said separating step and said viscosity-increasing step; and following said viscosity-increasing step, the glass gob on the supporting member that has been employed in said viscosity-increasing step is transferred onto said casting mold to mold into a preform for press molding.

In the third aspect, said glass melt can be supported on said supporting member in a floating state, or is floated after contacting with said supporting member.

In the third aspect, said supporting member can be comprised of multiple dividing members capable of separating and joining together in a cross direction;

with said dividing members in a joined state, the glass melt supported can be held for a prescribed period in a state of contact with a surface of said supporting member; and gas can be then blown from at least a portion of the surface of said supporting member to float said glass gob, after which said dividing members can be separated from each other to drop said glass gob vertically to transfer said glass gob onto said casting mold.

In the first, second and third aspects, in said molding step, said glass melt gob can be molded into a preform for press molding while being floated; as well as said casting mold can comprise a concave portion and a gas blow hole in a bottom of the concave portion, gas can be blown upward through said gas blow hole, said glass melt gob can be dropped into said concave portion, and said glass melt gob can be rotated with wind pressure from the gas that is blown to mold said glass melt gob into a spherical shape.

In the first, second and third aspects, viscosity of said glass melt flow flowing out of the pipe can be less than or equal to 10 dPa·s.

In the first, second and third aspects, said viscosity-increasing step can be conducted until viscosity of said glass melt gob reaches 20 to 200 dPa·s.

The fourth aspect of the present invention relates to a method for manufacturing optical elements, wherein the preform manufactured by the method of the first, second or third aspect is heated and precision press molded to obtain an optical element.

According to the present invention, high-quality preforms for press molding can be mass produced from glass melt with high productivity. Further, high-quality optical elements can be manufactured from these preforms for press molding.

Further, the molding of high-quality preforms from glass of low outflow viscosity becomes possible and the molding of high-quality spherical preforms by molding the glass while it is being rotated is possible. The present invention is particularly suited as a method of manufacturing spherical preforms of great weight from glass of low outflow viscosity.

BEST MODE OF IMPLEMENTING THE INVENTION

The present invention will be described in greater detail below.

[Method for Manufacturing Preforms for Press Molding]

The first method for manufacturing preforms for press molding of the present invention (also referred to as "Method 1" hereinafter) is:

a method for manufacturing preforms for press molding in which a glass melt gob is separated from glass melt flow flowing out of a pipe and said glass melt gob is molded into a preform for press molding on a glass gob casting mold, comprising the steps of:

receiving a front end of said glass melt flow on a supporting member positioned beneath said pipe, dropping said supporting member downward to separate a glass melt gob from said glass melt flow, and transferring said glass melt gob onto the glass gob casting mold to conduct a molding step, wherein during a period from when the front end of said glass melt flow is received with the supporting member in said receiving step to when said glass melt gob is transferred onto the glass gob casting mold in said transferring step, said glass melt is supported in a state of contact with said supporting member and heat of said glass melt is removed with thermal conduction to increase viscosity of said glass melt in a viscosity-increasing step, and following increasing viscosity said glass melt, an operation in which said glass melt is floated on said supporting member is conducted.

The second method for manufacturing preforms for press molding of the present invention (also referred to as "Method 2" hereinafter) is:

a method for manufacturing preforms for press molding comprising a separating step in which a glass melt gob is separated from a front end of glass melt flow flowing out of a pipe and a molding step in which said glass melt gob is molded into a preform for press molding on a glass gob casting mold, wherein said separating step is conducted by supporting the front end of said glass melt flow with a first supporting member positioned beneath said pipe, and then a glass melt gob is separated from the glass melt flow by dropping said first supporting member downward or removing support with said first supporting member;

said glass melt gob separated in said separating step is transferred onto a second supporting member and held for a prescribed period to increase viscosity of said glass melt gob in a viscosity-increasing step; and following said viscosity-increasing step, said glass gob is transferred from said second supporting member onto said casting mold.

The third method for manufacturing preforms for press molding of the present invention (also referred to as "Method 3" hereinafter) is:

a method for manufacturing preforms for press molding comprising a separating step in which a glass melt gob is separated from a front end of glass melt flow flowing out of a pipe and a molding step in which said glass melt gob is molded into a preform for press molding on a glass gob casting mold, wherein said separating step is conducted by supporting the front end of said glass melt flow with a supporting member positioned beneath said pipe, and then the glass melt gob is separated from the glass melt flow by dropping said supporting member downward;

said glass melt gob separated is held for a prescribed period on said supporting member to increase viscosity of said glass melt gob in a viscosity-increasing step;

multiple supporting members are sequentially employed to conduct said separating step and said viscosity-increasing step; and following said viscosity-increasing step, the glass gob on the supporting member that has been employed in said viscosity-increasing step is transferred onto said casting mold to mold into a preform for press molding.

Glass melt to which components imparting a low-temperature softening property and components imparting a high refractive index have been added in relatively large quantities to achieve a high refractive index without losing the low-temperature softening property in the glass requires that the glass outflow temperature be raised, thereby markedly reducing the viscosity of the glass when flowing out. When hot molding is conducted with such glass, glass in a low viscosity state folds in on itself, entraining gas, incorporating bubbles into the interior, and precluding use of the glass as a preform.

Accordingly, in Method 1, the front end of glass melt flow flowing out of a pipe or a glass melt gob that has been separated is supported in a state of contact with a supporting member, increasing the viscosity of the front end of the glass melt flow to be separated into a glass melt gob or the viscosity of the glass melt gob that has been separated. The supporting member is maintained at a temperature at which the glass melt does not fuse, that is, a temperature that is adequately lower than the temperature of the glass melt, thereby causing the supporting member to remove heat from the glass melt with thermal conduction by bringing the glass melt directly in contact with the supporting member. With the glass melt being floated on the supporting member, the gas or atmosphere that is applied to the glass melt to provide the wind pressure necessary for floating inserts between the glass melt and the supporting member, functioning as an insulating layer and preventing the viscosity of the glass melt from quickly increasing. By contrast, by bringing the supporting member into direct contact with the glass melt, it is possible to quickly increase the viscosity of the glass melt. Next, the glass melt that has been obtained by separation is floated on the supporting member and the viscosity of the glass melt gob as a whole is rendered nearly uniform. Since the portion contacting with the supporting member is a portion of the surface of the glass melt, the increase in viscosity of the glass melt is localized. Accordingly, floating the glass melt on the supporting member reduces dissipation of heat into the supporting member with thermal conduction and renders heat in the glass melt uniform. Thus, the viscosity differential (viscosity distribution) within the glass melt gob can be reduced, and the overall viscosity of the glass melt gob can be increased. In Method 1, floating of the glass melt may be begun after separating the glass melt gob as set forth above, before separating the glass melt gob, or simultaneously with separation of the glass melt gob.

In Methods 2 and 3, a viscosity-increasing step in which the viscosity of the glass melt gob that has been separated from the glass melt flow is increased, is provided between the separating step, in which the glass melt gob is separated from the glass melt flow, and the molding step, in which the glass melt gob is molded into a preform for press molding. By conducting this viscosity-increasing step, the inward folding of the glass and the generation of bubbles can be inhibited even in glass of extremely low viscosity when flowing out, and high-quality preforms for press molding can be manufactured.

Methods 1 to 3 will be described in detail below.

[Method 1]

In Method 1, the front end of glass melt flow flowing out of a pipe is supported on a supporting member positioned beneath the pipe. Next, a glass melt gob is separated from the glass melt flow and the glass melt gob is transferred from the supporting member onto a glass gob casting mold. During at least one of the above steps, the glass melt on the supporting member is supported for a prescribed period in contact with the supporting member to increase the viscosity of the glass melt gob or the front end of the glass melt flow to be separated into a glass melt gob.

In Method 1, a clarified and homogenized glass melt is accumulated in a container, the glass melt is caused to flow through a pipe made of platinum or a platinum alloy, for example, the top of which is connected to the container, and the glass melt is caused to flow, preferably continuously at a constant rate, out of a glass flow outlet at the bottom end of the pipe. In Method 1, separation of the glass melt gob is conducted by receiving the front end of the glass melt flow on a supporting member positioned beneath the pipe and then dropping the supporting member downward (also referred to as "drop cutting" hereinafter). Thus, surface tension can be utilized to separate a glass melt gob corresponding to the weight of one preform from the outflowing glass melt flow without leaving any trace of cutting. In the present invention, drop cutting can be conducted with the front end of the glass melt flow in a state of contact with the surface of the supporting member, or with the glass melt flow being floated on the supporting member.

In Method 1, receiving the front end of the glass melt flow in contact with the supporting member makes it possible to increase the viscosity of the front end of the glass flow that is to become the glass melt gob even before separation.

As set forth above, when low-viscosity glass is molded suddenly into a preform, glass ends up folding inward and bubbles end up being mixed in. During molding, the glass is subjected to external forces, such as rapidly rotating, turning, and floating with upward wind pressure applied by blowing gas onto the glass as described further below. When such external forces are applied to glass of low viscosity, the glass folds inward, ambient gas is entrained in the glass, and bubbles end up forming. Further, in the above glass floating method, the gas that is blown is entrained in the glass and ends up forming bubbles. By contrast, in the glass the viscosity of which has been increased by contact with the supporting member as set forth above, since the viscosity has been increased to a degree at which the above problems do not occur even when external forces such as rotating are applied, high-quality preforms for press molding can be obtained by molding while rotating the glass at high speed. In particular, in Method 1, the viscosity of the front end of the glass melt flow to become a glass melt gob is increased through contact with the supporting member, thereby efficiently promoting cooling of the glass through thermal conduction.

Subsequently, the glass melt gob of adequately increased viscosity is floated on the supporting member, and then transferred onto a casting mold where the molding step is conducted. The floating of the glass melt gob can be conducted by blowing gas from the surface of the supporting member. In Method 1, bringing the front end of the glass melt flow into contact with the supporting member permits an increase in the viscosity of the glass in a relatively short time. Thus, cooling of the surface of the glass melt in contact with the supporting member is promoted, and although the distribution of viscosity in the glass melt gob is skewed, floating the glass melt gob on the supporting member renders the temperature distribution (viscosity distribution) uniform. Once the viscosity distribution of the glass gob has been rendered uniform in this manner, the glass gob can be transferred to the molding step and a high-quality preform can be molded. Further, transferring the glass melt onto the casting mold after having floated it on the supporting member is effective in achieving a smooth transfer onto the casting mold. When mass producing preforms, the operations of receiving the front end of the glass melt flow on the supporting member and dropping the supporting member to separate the glass melt flow can be repeatedly conducted to continuously separate glass melt gobs for molding into preforms from a continuous glass melt flow. The separation cycle is equal to the time required for an amount of glass corresponding to one preform to flow out. The time the glass melt remains on the support is shorter than this cycle. During this short period, the viscosity of the glass melt gob must be increased to within a range suited to the transfer of the glass gob onto the casting mold and molding. In Method 1, since the glass melt is brought into direct contact with the supporting member, the viscosity of the glass melt gob can be adequately increased within such a short period.

The supporting member employed in Method 1 may be comprised of a single member, or may be comprised of multiple members. The supporting member is preferably comprised of multiple dividing members capable of separating and joining together in a cross direction. In this case, the viscosity-increasing step can be conducted by holding the front end of the glass melt flow for a prescribed period in a state of contact with the surface of the supporting member with the dividing members in a joined state. After increasing the viscosity of the glass in this manner, the molding step can be conducted after blowing gas from at least a portion of the surface of the supporting member to float the glass melt gob and then separating the dividing members each other to drop the glass gob vertically to transfer the glass gob onto the casting mold. Transferring the glass gob onto the casting mold by dropping it vertically by separating the supporting member comprised of multiple dividing members can reduce the shock of the drop to enhance the quality of the preform obtained. When the glass gob fuses to any one of the dividing members in the course of separating the dividing members, it becomes difficult to drop the glass gob vertically. However, in Method 1, fusion of the glass can be prevented by blowing gas from the dividing members. A boundary portion where the dividing members join together is desirably incorporated into the surface of the supporting member holding the glass melt gob in a state of contact. This permits reliable dropping of the glass melt gob when the dividing members are separated. Further, to the extent possible, it is preferable that the boundary portion of the dividing members is positioned at the center of the glass melt gob and the dividing members are separated at equal speed to prevent the glass melt gob from catching on one of dividing members.

[Method 2]

In Method 2, the separating step is conducted on a first supporting member, after which the glass melt gob is transferred onto a second supporting member from the first supporting member and the viscosity-increasing step is conducted. In Method 2, conducting the viscosity-increasing step and the separating step on the separate supporting members makes it possible to conduct the separating step and viscosity-increasing steps in parallel, affording the advantage of enhancing molding efficiency. Further, the viscosity-increasing step can be conducted for a longer period, affording the advantage of adequately increasing the viscosity of the glass gob.

In Method 2, the separating step is conducted by supporting the front end of the glass melt flow with the first supporting member positioned beneath the pipe, and then a glass melt gob is separated from the glass melt flow by dropping the first supporting member downward or removing support with the first supporting member. As an example of the separation method where support by the first supporting member is removed to separate the glass melt gob from the glass melt flow, the first supporting member is comprised of multiple dividing members capable of separating and joining together in a cross direction. With the dividing members joined together, the front end of the glass melt flow is received on the surface of the supporting member. Next, the dividing members are separated from each other. Thus, the glass melt gob can be separated from the glass melt flow. A boundary portion where the dividing members join together is desirably incorporated into the surface of the supporting member receiving the front end of the glass melt flow. This permits reliable dropping of the glass melt gob when the dividing members are separated. Further, to the extent possible, it is preferable that the boundary portion of the dividing members is positioned at the center of the glass melt gob and the dividing members are separated at equal speed to prevent the glass melt gob from catching on one of dividing members. The front end of the glass melt flow can be received in a state of contact with the surface of the supporting member, or can be floated on it. It is desirably received in a state of contact so that the glass melt gob can be transferred onto the second supporting member without inward folding of the glass gob.

The above-mentioned drop cutting may also be employed as a method of separating glass melt gobs.

Next, the separated glass melt gob is transferred onto the second supporting member and the viscosity-increasing step is conducted. When employing the first supporting member comprised of multiple dividing members and separating the dividing members to separate the glass melt gob, before separating the glass melt gob, the second supporting member can be positioned beneath the first supporting member to permit simultaneous separation of the glass melt gob and transfer of the glass melt gob onto the second supporting member. With the first supporting member comprised of multiple dividing members capable of separating and joining together in a cross direction, a glass melt gob that has been held on the first supporting member can be dropped downward by separating the dividing members, thereby transferring the glass melt gob to the second supporting member. In this case, a boundary portion where the dividing members join together is desirably incorporated into the surface of the first supporting member holding the glass melt gob. Further, it is desirable for gas to be blown from at least a portion of the surface of the first supporting member to float the glass gob, after which the dividing members are separated to drop the glass gob downward. In this case, the gas flow into the first supporting member is desirably timed to take place just before drop insertion (separation of the dividing members) to increase the viscosity of the lower surface of the glass melt gob. However, based on the viscosity of the glass melt, this timing can be accelerated. In the course of transferring the glass melt gob onto the second supporting member, it is also possible for floating gas to flow in from the start of support of the glass melt so long as there is no inward folding of the glass melt gob.

Subsequently, the glass melt gob is held for a prescribed period on the second supporting member to increase the viscosity thereof. This viscosity-increasing step may be conducted with the glass melt gob in contact with the second supporting member, but is desirably conducted without contact to permit a uniform viscosity distribution in the glass melt. When conducting the viscosity-increasing step without contact, the viscosity of the glass melt can be increased to the desired viscosity while floating the glass melt gob. Specifically, the viscosity of the glass melt gob can be increased while floating the glass melt gob by blowing flotation gas from the surface of the second supporting member. In Method 2, a constant flow of floating gas to the second supporting member is desirable. This is to reduce the shock during dropping of the glass melt gob and achieve a uniform viscosity distribution in the glass melt gob by floating the glass melt.

[Method 3]

In Method 3, the separating step and the viscosity-increasing step on the supporting member are sequentially conducted with multiple supporting members. Specifically, in addition to the step of separating a glass melt gob on a supporting member positioned beneath an outflow pipe and the step of increasing the viscosity of the glass melt gob that has been separated by withdrawing the supporting member that is holding it from beneath the outflow pipe, the step of positioning another supporting member beneath the outflow pipe and repeating the process of this separating step and viscosity-increasing step can be used to mass produce preforms. In Method 3, in addition to the advantages afforded by conducting the above-described viscosity-increasing step, since multiple supporting members can be used to separate the separating step and viscosity-increasing step in time, the viscosity-enhancing step can be conducted for an extended period, affording the advantage of permitting the imparting of an adequately high viscosity to the glass gob. In Method 3, the separating step, viscosity-increasing step and the transfer to the molding step from the viscosity-increasing step can be conducted as in above-described Method 2.

Common aspects of Methods 1 to 3 will be described below.

Methods 1 to 3 are suited to the case where a low-viscosity glass melt with a viscosity of less than or equal to 10 dPa·s, preferably less than or equal to 7 dPa·s, and further preferably from 1 to 5 dPa·s, is caused to flow out of a pipe.

The outflow viscosity can be calculated in the following manner. The viscosity of the glass at various temperatures is measured in advance and a graph of viscosity against temperature (a viscosity curve) is prepared. The liquid phase temperature is separately measured, and the viscosity at the liquid phase temperature is read from the graph as the liquid phase viscosity. Similarly, the viscosity exhibited by the glass at the outflow temperature is read from the graph as the outflow viscosity.

The glass employed in the present invention is not specifically limited. Since preforms are to be press molded, a glass exhibiting a low-temperature softening property is desirable, with glass having a glass transition temperature (Tg) of less than or equal to 600° C. being preferred. Examples of glasses that are desirable from the aspect of composition are glasses containing $B_2O_3$ and $La_2O_3$, phosphate glasses, fluorophosphate glasses, and alkali metal oxide-containing glasses.

Methods 1 to 3 are suited to the molding of spherical preforms with a weight of greater than or equal to 0.5 g, preferably preforms with a weight of greater than or equal to 0.7 g, and still more preferably, preforms with a weight of 0.8 to 1.3 g. In Methods 1 to 3, since the glass melt gob is transferred to the molding step after adequately increasing the viscosity thereof, high-quality spherical preforms can be manufactured without problems such as inward folding due to external forces such as rotation during the molding step.

To increase the weight precision of the preform, it suffices to cause glass melt to continuously flow out of the pipe at a constant flow rate and separate glass melt gobs at a constant time interval. This time interval is called the "cutting time." In the present invention, when mass producing preforms using a single pipe, a single supporting member, and a single casting mold, the glass melt gob separating step and the viscosity-increasing step must both be completed within the cutting time; there is thus a time limitation. Further, the greater the volume of the glass melt becomes, the greater the tendency of inward folding and entrainment of bubbles becomes in the course of molding (spherical shaping) of the glass melt gobs. Thus, in the manufacturing of heavy preforms and in the mass production of preforms, either Method 2 or Method 3, both of which utilize multiple supporting members, is desirably employed.

A supporting member the main body of which is comprised of a heat-resistant material (such as stainless steel) and in which the surface receiving the glass in a contact or non-contact state is comprised of a heat-resistant porous material may be employed. Further, a supporting member in which multiple gas-blowing holes are arranged in concentric circles on the surface supporting the glass may also be employed.

In the present invention, the glass melt gob and the supporting member may enter into contact. However, when the supporting member is at elevated temperature, the glass melt will sometimes fuse to it, making it difficult to transfer the glass gob to the next step. Thus, the supporting member employed in the present invention desirably has a cooling mechanism. Specifically, a supporting member having internal water passages through which cooling water is run to cool it may be employed. It suffices to set the degree of cooling so that the supporting member temperature is maintained within a range capable of reliably preventing fusion.

Further, the supporting member employed in the viscosity-increasing step is preferably thin. In the course of dropping the glass gob from the supporting member onto the casting mold, the drop distance increases when the supporting member is thick. When the drop distance increases, there is a risk of the shock of the drop causing the glass gob to fold inward, generating striae, and of the shock causing ambient gas to be entrained into the glass, generating bubbles. To eliminate such problems, the drop distance from the supporting member to the casting mold is preferably less than or equal to 30 mm, more preferably less than or equal to 15 mm. Further, the thickness of the supporting member is preferably less than or equal to 20 mm, more preferably less than or equal to 10 mm.

When increasing the viscosity of the glass, the viscosity of the glass gob is increased so that striae and bubbles are not generated in the glass during transfer to the molding step or during the molding step. The time required to increase the viscosity—that is, in Method 1, the time from when the front end of the glass melt flow or the glass gob contacts with the supporting member to the time just before transfer of the glass melt gob on the supporting member onto the glass gob casting mold, and in Methods 2 and 3, the time required for the viscosity-increasing step—can be suitably determined based on the viscosity of the glass. For example, it can be from 3 to 20 s, preferably from 3 to 10 s. The viscosity-increasing step may be conducted to render the viscosity of the glass gob from 20 to 200 dPa·s, preferably 50 to 200 dPa·s, and more preferably 80 to 150 dPa·s.

The casting mold employed in the molding step may be selected based on the desired shape of the preform. For example, with a casting mold comprising a concave portion for housing a glass gob, a glass gob may be introduced into the concave portion following the viscosity-increasing step and molded into a preform. In the molding step, the glass is desirably molded into a preform while being floated. Specifically, the glass can be molded into a preform while being floated by blowing gas from multiple gas-blow holes provided on the bottom of the concave portion of the preform casting mold to apply upward wind pressure on the glass in the concave portion. The floating need not consist of maintaining the glass in a floating state above the concave portion; it suffices for the floating to reduce the duration of contact between the glass and casting mold so that wrinkling on the preform surface or damage known as flaws and crack does not occur. This is because when a glass gob contacts the casting mold, it is locally cooled at the point of contact and shrinks. At the outset of molding, this shrinkage causes wrinkles on the surface of the preform, and during the latter half of the molding step, causes flaws and crack. By contrast, when the glass is floated in the manner set forth above, the contact between the mold and the glass that causes the above-described problems can be reduced.

One desirable form of the molding method employed in the present invention is a molding method in which gas is blown upward through gas blow holes provided in the bottom of the concave portion of a preform casting mold, glass that has been subjected to a viscosity-increasing step is introduced in the concave portion, and wind pressure generated by blowing gas is used to rotate the glass, forming a spherical preform. In this method, a casting mold may be employed in which the concave portion is comprised of a bottom having gas blow holes and a smoothly inclined surface enclosing the bottom, the inner diameter of the concave portion continuously increases from the bottom to the top, and the inclined surface is symmetrical for a given rotation angle. Examples of such a casting mold are: a casting mold in which the vicinity of the vertex of a right circular cone is employed as the concave portion and the inclined surface of the cone corresponds to the inclined surface of the concave portion; a casting mold equipped with a trumpet-shaped concave portion; and a casting mold equipped with a concave portion in the form of a venturi tube. When gas blow holes are present in the bottom of such a concave portion and the shape is such that the inner diameter of the concave portion increases from bottom to top, the wind pressure of the gas blown through the gas blow holes intensifies as the distance to the bottom of the concave portion decreases. When glass melt is introduced into the concave portion, it is subjected to intense upward wind pressure after dropping to a certain level, and floats. As the glass floats upward, the wind pressure to which the glass is subjected weakens, and the glass rolls along the inclined surface. This motion is repeated. Since the direction of rotation of the glass is random, the glass is molded into a spherical shape. A spherical preform can thus be molded. Since the glass is subjected to intense upward wind pressure when it approaches the bottom, the diameter of the gas blow holes are desirably made smaller than the diameter of the targeted preform. However, when glass the viscosity of which has not been adequately increased is introduced, there are problems in that the glass clogs the gas blow holes, the gas collides with and breaks the glass, and blown gas is entrained in the glass. The present invention provides effective methods for eliminating such problems.

In addition to the above, one method in which gas is blown from the entire surface of the concave portion made of a porous material and glass that has been introduced into the concave portion is applied upward wind pressure to mold it into a preform can be employed. The present invention is also suited to this method.

A preform for press molding can be obtained by molding glass on such a concave portion into the shape of a preform, cooling the glass to a temperature at which it will not deform even when subjected to external forces, and removing the glass from the casting mold.

[Method for Manufacturing Optical Elements]

In the method for manufacturing optical elements of the present invention, the preform manufactured by the method for manufacturing preforms for press molding of the present invention is heated and precision press molded to obtain an optical element.

As set forth above, high-quality preforms can be manufactured with great productivity by the method for manufacturing preforms for press molding of the present invention. Thus, the preforms for press molding obtained by such a method can be employed to manufacture optical elements with high productivity.

Precision press molding, also known as mold optics molding, is a method of forming the shape of an optically functional surface by press molding that is already well known in the technical field of the present invention. Surfaces of optical elements that transmit, refract, diffract, or reflect light rays are called optically functional surfaces. Taking the example of lenses, the aspherical surface of an aspherical lens, and the spherical or other lens surface of a spherical lens correspond to optically functional surfaces. In precision press molding, the molding surface of a pressing mold is transferred precisely to glass to form an optically functional surface by press molding. That is, the optically functional surface requires no finishing in the form of mechanical processing such as grinding or polishing.

Known pressing molds such as pressing molds in which a mold separation film is provided on the molding surface of a mold material such as silicon carbide or an ultrahard material can be employed in precision press molding. Of these, the use of a pressing mold made of silicon carbide is preferred. A carbon-containing film, noble metal alloy film, or the like may be employed as the mold separation film. From the perspectives of durability and cost, a carbon-containing film is desirably employed.

In precision press molding, to keep the molding surface of the pressing mold in good condition, pressing is desirably conducted in a nonoxidizing atmosphere. A nonoxidizing atmosphere such as nitrogen, a mixture of nitrogen and hydrogen, and the like is desirably employed.

Precision press molding methods particularly suited to the method for manufacturing optical elements of the present invention will be described next.

(Precision Press Molding Method 1)

In this method, the above-described preform is introduced into a pressing mold, both the pressing mold and the preform are heated together, and precision press molding is conducted (referred to as "Precision Press Molding Method 1" hereinafter).

In Precision Press Molding Method 1, both the pressing mold and the preform are desirably heated to a temperature at which the glass constituting the preform exhibits a viscosity of from $10^6$ to $10^{12}$ dPa·s and precision press molding is conducted.

The precision press-molded product is desirably removed from the pressing mold after being cooled to a temperature at which the above-described glass exhibits a viscosity of greater than or equal to $10^{12}$ dPa·s, preferably greater than or equal to $10^{14}$ dPa·s, and more preferably, greater than or equal to $10^{16}$ dPa·s.

Based on the above-stated conditions, the shape of the molding surface of the pressing mold can be precisely transferred to the glass and the precision press-molded product can be removed without deformation.

In this method, after heating the above-described preform, it is introduced into a pressing mold and precision press molded. That is, the pressing mold and the preform are separately preheated and the preheated preform is introduced into the pressing mold and precision press molded (referred to hereinafter as Precision Press Molding Method 2).

Based on this method, it is possible to preheat the above-described preform prior to introduction into the pressing mold. This permits the manufacturing of optical elements with good surface precision and without surface defects while shortening the cycle time.

The preheating temperature of the pressing mold is desirably set lower than the preheating temperature of the preform. Preheating the pressing mold to a lower temperature permits a reduction in the wear and tear on the mold.

Since this method does not require heating of the preform in the pressing mold, the number of pressing molds employed can be reduced.

In Precision Press Molding Method 2, preheating is desirably conducted to a temperature at which the glass constituting the above-described preform exhibits a viscosity of less than or equal to $10^9$ dPa·s, preferably a viscosity of $10^9$ dPa·s.

Further, preheating is desirably conducted while floating the above-described preform, with preheating to a temperature at which the glass constituting the above-described preform exhibits a viscosity of from $10^{5.5}$ to $10^9$ dPa·s being preferable and greater than or equal to $10^{5.5}$ dPa·s but less than $10^9$ dPa·s being of even greater preference.

Cooling of the glass is desirably started simultaneously with the start of pressing or during pressing.

The temperature of the pressing mold is adjusted to a temperature lower than the preheating temperature of the above-described preform; it suffices to use a temperature at which the above-described glass exhibits a viscosity of $10^9$ to $10^{12}$ dPa·s as yardstick.

In this method, following pressing, cooling is conducted to a temperature at which the viscosity of the glass is greater than or equal to $10^{12}$ dPa·s before removing the optical element from the mold.

The optical element that is precision press molded is removed from the pressing mold and gradually cooled as needed. When molding a lens, centering and edging may be conducted.

In this manner, based on the present invention, it is possible to manufacture a variety of optical elements, including various lenses such as spherical lenses, aspherical lenses, and microlenses; diffraction gratings; lenses with diffraction gratings; lens arrays; and prisms for applications such as lenses comprising image-pickup optical systems such as digital cameras and film cameras; image-pickup lenses mounted in cellular telephones equipped with cameras; and lenses for guiding light along an optical path employed in data reading and/or writing on optical recording media such as CDs and DVDs. Further, by using copper-containing glass preforms, it is possible to manufacture optical elements having color-correcting functions in the form of semiconductor image-pickup elements.

As necessary, optical films such as antireflective films, fully reflective films, partially reflective films, and films having spectral characteristics may be provided on these optical elements.

EMBODIMENTS

The present invention will described below with greater specificity through Embodiments. However, the present invention is not limited to these Embodiments.

Embodiments 1 to 6

Figure 1:
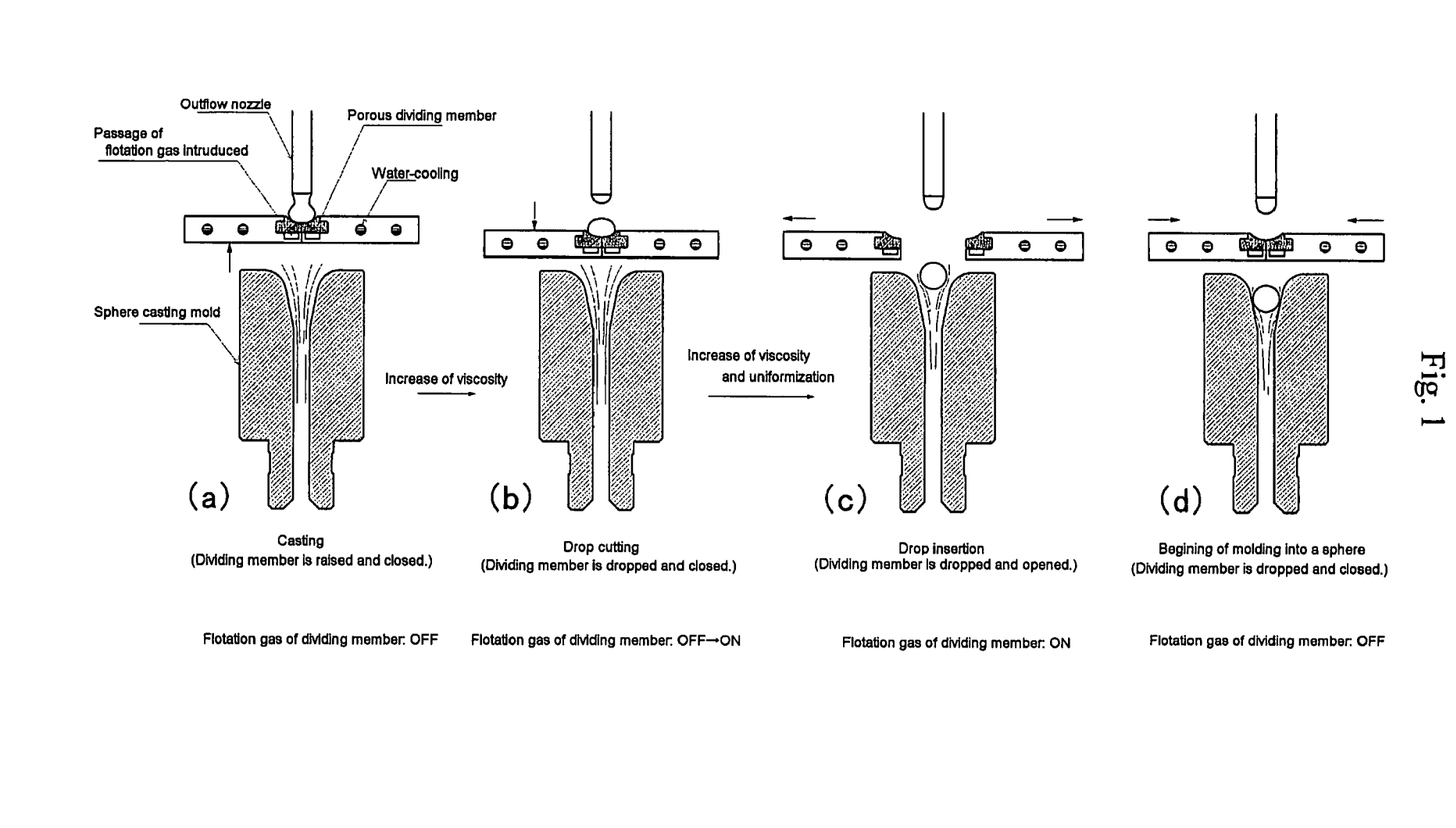
FIG. 1 is a schematic diagram of the device employed in Embodiments 1 to 6.

Comparative Examples 1 to 4 (FIG. 1)

Cullets of glass having a refractive index (nd) of 1.8468, an Abbé number (v(nu)d) of 23.5, and principal components in the form of $P_2O_5$, $R_2O$ (R:Li,Na,K), and $Nb_2O_5$ were charged to a platinum crucible and melted at 1,000° C. The glass was then debubbled and clarified at 1,100° C. and homogenized by stirring, yielding glass melt. The glass melt was caused to pass through a platinum pipe of regulated temperature connected to the bottom of the crucible and caused to continuously flow out of a 900° C. platinum alloy flow nozzle (with an inner diameter of 0.8 mm) at a flow rate of 0.55 kg/hour. The liquid phase temperature of the glass was 880° C. and the liquid phase viscosity was 5.3 dPa·s. Thus, the outflow viscosity of the glass melt as calculated from the liquid phase temperature and the liquid phase viscosity was 4.1 dPa·s.

The glass melt flowing out under the above condition was molded into spherical preforms of 146 mm$^3$ (553 mg) using the device shown in FIG. 1. First, porous dividing members were joined together and the glass melt flow was supported by a concave portion (FIG. 1(a)). When a prescribed quantity of glass melt had collected on the porous dividing members, the porous dividing members were rapidly dropped to sever the glass melt flow, cutting off a glass melt gob on the porous dividing members (FIG. 1(b)). After rapidly dropping the porous dividing members, the glass gob was held on the dividing members for a prescribed period just below the outflow nozzle until the viscosity of the glass melt gob reached 30 dPa·s. Next, the porous dividing members were separated for 70 to 100 msec. and the glass melt gob was dropped into a glass gob casting mold (referred to hereinafter as a "sphere casting mold") for molding spherical preforms (FIG. 1(c)). The glass melt gob in the casting mold was rapidly rotated into a spherical shape while being in a state of approximate flotation with flotation gas blown out from the sphere casting mold (FIG. 1(d)). This operation was repeated each 3.8 seconds to mold the continuously flowing glass melt into spherical preforms.

Tables 1 and 2 give the results of investigation into the quality of the various spherical preforms molded by varying the time from when the porous dividing members were rapidly dropped to when they were separated, and the outflow timing (time from the start of casting) of the flotation gas (flow rate: 0.8 L/min) flowing into the porous dividing members.

As is shown in Table 2, in the preforms of Comparative Examples 2 to 4 in which flotation gas was caused to flow to the porous dividing members from the start of casting and the glass melt gobs were drop cut while being supported in a state of flotation and inserted by dropping into the casting mold, entrained bubbles of 1 mm or more were incorporated irrespective of when the porous dividing members were separated. Further, linear inward folding from the surface of the preform produced numerous striae. By contrast, in Comparative Example 1, in which the glass melt was cast, drop cut, and inserted by dropping into the casting mold without causing flotation gas to flow into the porous dividing members, no bubbles or striae were observed in the preforms. However, during drop insertion of the glass melt gobs into the casting mold, about 5 to 15 percent of the glass melt gobs failed to enter the sphere casting mold. Further, island-shaped protrusions were observed at positions where the glass melt had been supported with the porous dividing members. When lenses were molded from spherical preforms having such protrusions, most were of suitable quality. However, since the protrusions caused the position of the preform to vary on the casting mold, lens eccentricity failures sometimes occurred. In Embodiments 1 to 6 in which flotation gas was caused to flow to the porous dividing members prior to their separation, failures of glass melt gob drop insertion did not occur and the preform protrusions diminished, with no striae or bubbles being observed. It will be understood from Table 1 that improvement in the protrusions on the preform surface was achieved by accelerating the timing of the flotation gas flowing to the porous dividing members. Even when a relatively early timing of the flotation gas flow caused a low frequency of bubbles and striae, intentionally delaying the timing of the separation of the porous dividing members to adjust the viscosity of the glass melt gobs yielded spherical preforms free of bubbles and striae.

TABLE 1

| | | | | | | |
|---|---|---|---|---|---|---|
| Timing of the flow of flotation gas to the dividing members (time from start of casting in msec.) | 1900* | 2500** | 2200 | 1600 | 2000 | 1400 |
| Timing of the separation of the dividing members (time from rapid dropping of dividing members in msec.) | 800 | 800 | 600 | 800 | 600 | 800 |
| Striae | None | None | None | None | None | None |
| Rate of bubble generation (%) | 0 | 0 | 0 | 0 | 0 | 0 |
| Degree of protrusions (spherical) | None | Within an allowable range | light | None | None | None |
| Indication of Embodiment or Comparative Example | Emb. 1 | Emb. 2 | Emb. 3 | Emb. 4 | Emb. 5 | Emb. 6 |

*Roughly simultaneous with rapid dropping of mold (drop cutting)
**Immediately prior to separation of dividing members

TABLE 2

| | | | | |
|---|---|---|---|---|
| Timing of the flow of flotation gas to the dividing members (time from start of casting in msec.) | ∞ No flow | 0 Constant | 0 Constant | 0 Constant |
| Timing of the separation of dividing members (time from rapid dropping of dividing members in msec.) | 800 | 0 | 500 | 800 |
| Striae | None | Present | Present | Present |
| Rate of bubble generation (%) | None | 85 | 33 | 8 |
| Degree of protrusions (spherical) | Heavy | None | None | None |
| Indication of Embodiment or Comparative Example | Comp. Ex. 1 | Comp. Ex. 2 | Comp. Ex. 3 | Comp. Ex. 4 |

Embodiment 7

Figure 2:
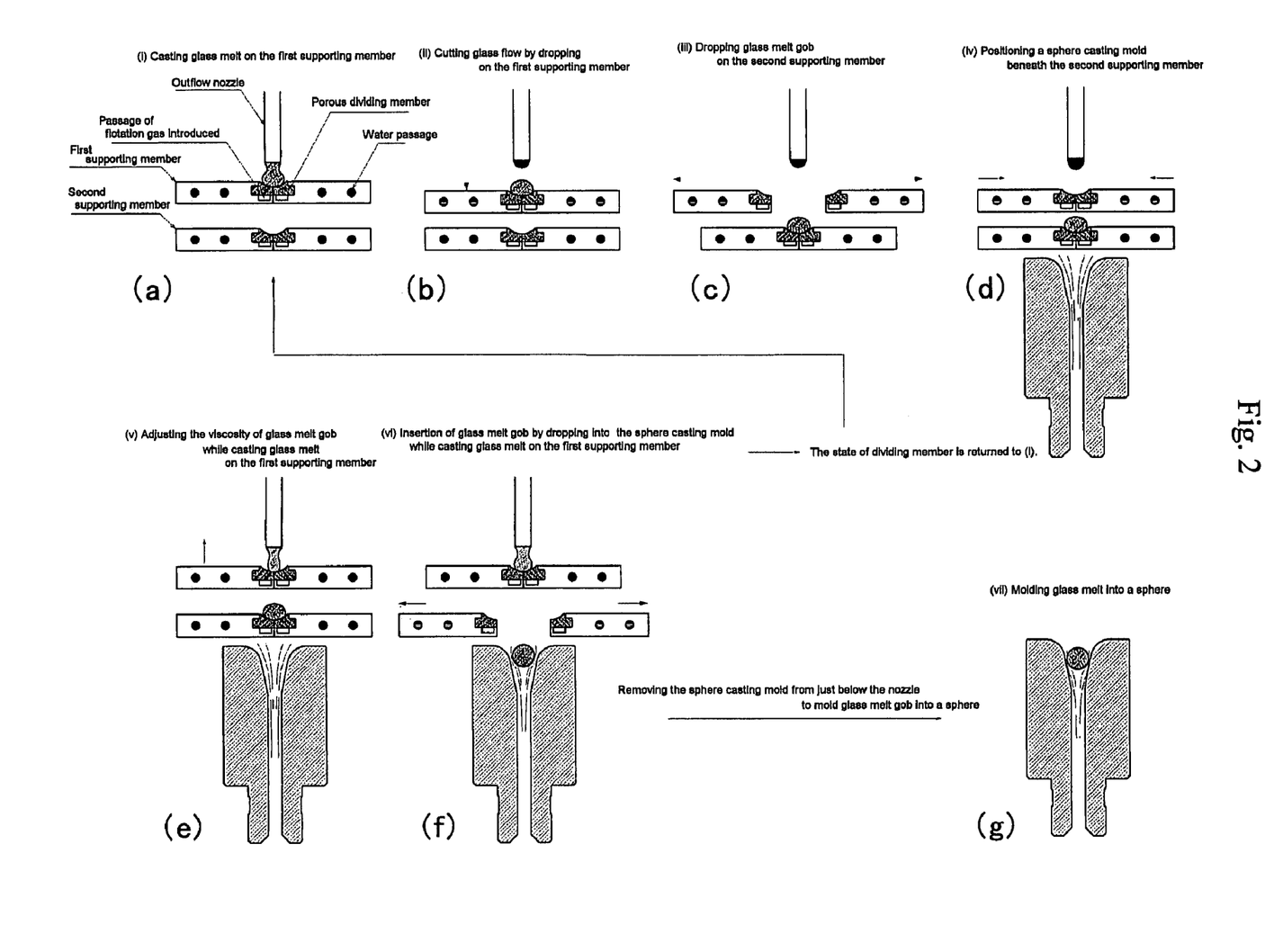
FIG. 2 is a schematic diagram of the device employed in Embodiment 7.

FIG. 2

Preforms for press molding were manufactured using the device shown in FIG. 2.

With the exception that the diameter of the flow outlet was changed from 0.8 mm to 0.9 mm in Embodiments 1 to 6, the same kinds of glass melt were caused to flow out under the same flow conditions as above. The glass flow rate was increased to 0.72 kg/hour by changing the diameter of the flow outlet. As shown in FIG. 2, two sets of dividing members were vertically positioned just below the flow outlet. The first supporting member was brought close to the nozzle to support the front end of the glass melt flow (FIG. 2(a)). When a prescribed volume of glass melt had accumulated, the first supporting member was rapidly dropped, a glass melt gob was cut by dropping from the glass melt flow (FIG. 2(b)). Subsequently, the dividing members of the first supporting member were separated for 70 to 100 msec., causing the glass melt to insert by dropping onto the second supporting member (FIG. 2(c)). Immediately prior to separation of the first supporting member, flotation gas was blown from the surface of the first supporting member, floating the glass melt glob. Next, the first supporting member was rapidly raised, supporting anew the front end of the glass melt flow (FIG. 2(e)). Simultaneously, the glass melt was cooled to increase the viscosity thereof while being held in a state of non-contact on the second supporting member. In this step, a sphere casting mold was positioned beneath the second supporting member (FIG. 2(d)). Next, after the viscosity of the glass melt gob had increased to 50 dPa·s or more, the dividing members of the second supporting member were separated, the glass melt gob was inserted by dropping into the sphere pressing mold (FIG. 2(f)).

It is also possible that, once the glass melt gob is being held in a state of contact with the second supporting member, gas is blown from the second supporting member to float the glass melt gob and switch to a non-contact holding state.

After drop insertion, the sphere casting mold was withdrawn from just below the nozzle, the glass melt gob was cooled while being molded into a sphere, and a spherical preform was obtained (FIG. 2(g)). The above operation was repeated each 2.9 s to continuously mold glass melt that flowed out into 146 mm$^3$ spherical preforms (553 mg). No bubbles or striae were observed in the spherical preforms molded, and the shape thereof was good.

Since a second supporting member was provided to increase viscosity in this method, it was possible to lengthen the duration of the viscosity-increasing step even when the molding cycle was shortened. Thus, molding efficiency was better than in Embodiments 1 to 6, and it was possible to inhibit bubbles and striae.

Embodiment 8

Figure 3:
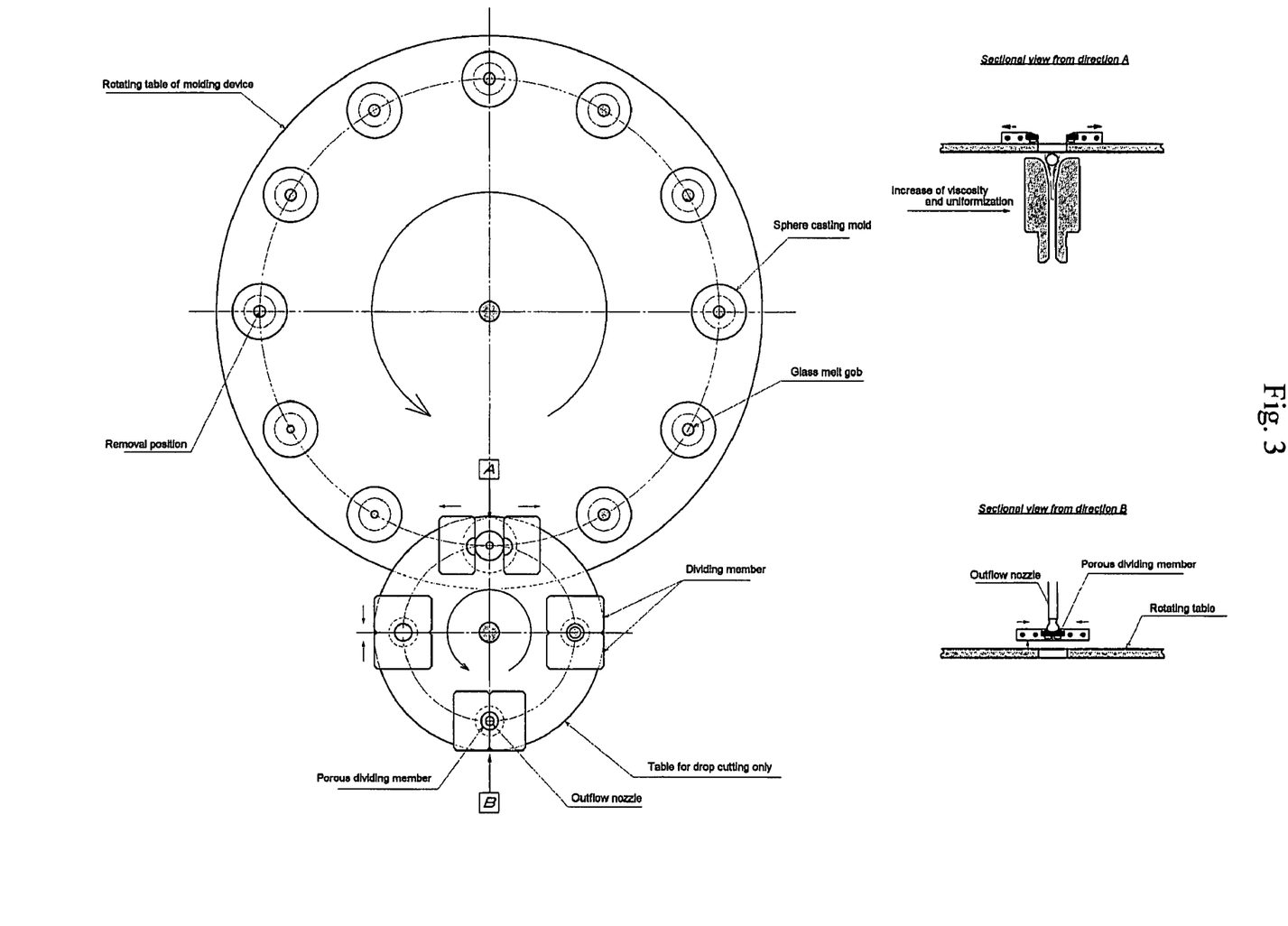
FIG. 3 is a schematic diagram of the device employed in Embodiment 8.

FIG. 3

Just the molding device employed in Embodiment 7 was changed to the device shown in FIG. 3 and 146 mm$^3$ (553 mg) spherical preforms were molded in the following manner. First, four sets of dividing members (supporting members) were positioned at equal intervals along the perimeter of a table undergoing 90° indexed rotation (referred to as the "dividing member table" hereinafter). Flotation gas was caused to constantly flow to each of the dividing members in advance so that the glass melt would be supported by flotation. A vertical displacement mechanism for dividing members, not shown in FIG. 3, positioned in the lower portion of the dividing member at position B, was used to independently drop and raise the dividing member at just position B.

Further, a rotating table (referred to as the "molding table" hereinafter) capable of indexed rotation and having a size greater than that of the above-described table was prepared and 12 sphere casting molds were positioned at equal intervals along the perimeter of the table. One of the 12 molds was positioned at position A so that when the dividing members were separated and the glass melt gob was dropped, the glass melt was received in the center of the sphere casting mold. The molding table was index rotated in increments of 30° and the rotation of the table was linked to drop insertion of the glass melt.

As seen in a sectional view from direction B, the supporting member (dividing members) at position B were raised to support the front end of the glass melt flow. When a prescribed volume of glass melt had accumulated on the supporting member, the supporting member was rapidly dropped to cut the glass melt flow by dropping and the rotating table was index rotated 90°. While repeating this operation, glass melt gobs were obtained one after another from the glass melt flow. The glass melt gobs were cooled to increase the viscosity thereof while being held by flotation on the supporting member. A method of promoting cooling based on the viscosity of the glass melt by blowing cooling gas to the upper surface of the glass melt being held by flotation may also be employed. Next, the dividing members at position A were opened, the glass melt was inserted into the sphere casting mold by dropping, and molding of the glass melt gob into a sphere was begun. Next, the molding table was index rotated by 30° to deliver an empty sphere casting mold to position A.

The above operation was repeated each 2.9 seconds and the glass melt flowing out was continuously molded into 146 mm$^3$ (553 mg) spherical preforms. No bubbles or striae were observed in the spherical preforms molded, and the shape thereof was good.

The configuration of the device is not limited to the description given in the above embodiment. For example, based on the viscosity of the glass melt, the glass melt drop insertion position may be located at a position rotated 90° or 270° from position A. The number of dividing members may also be varied based on molding efficiency and the viscosity of the glass melt.

Embodiment 9

Figure 4:
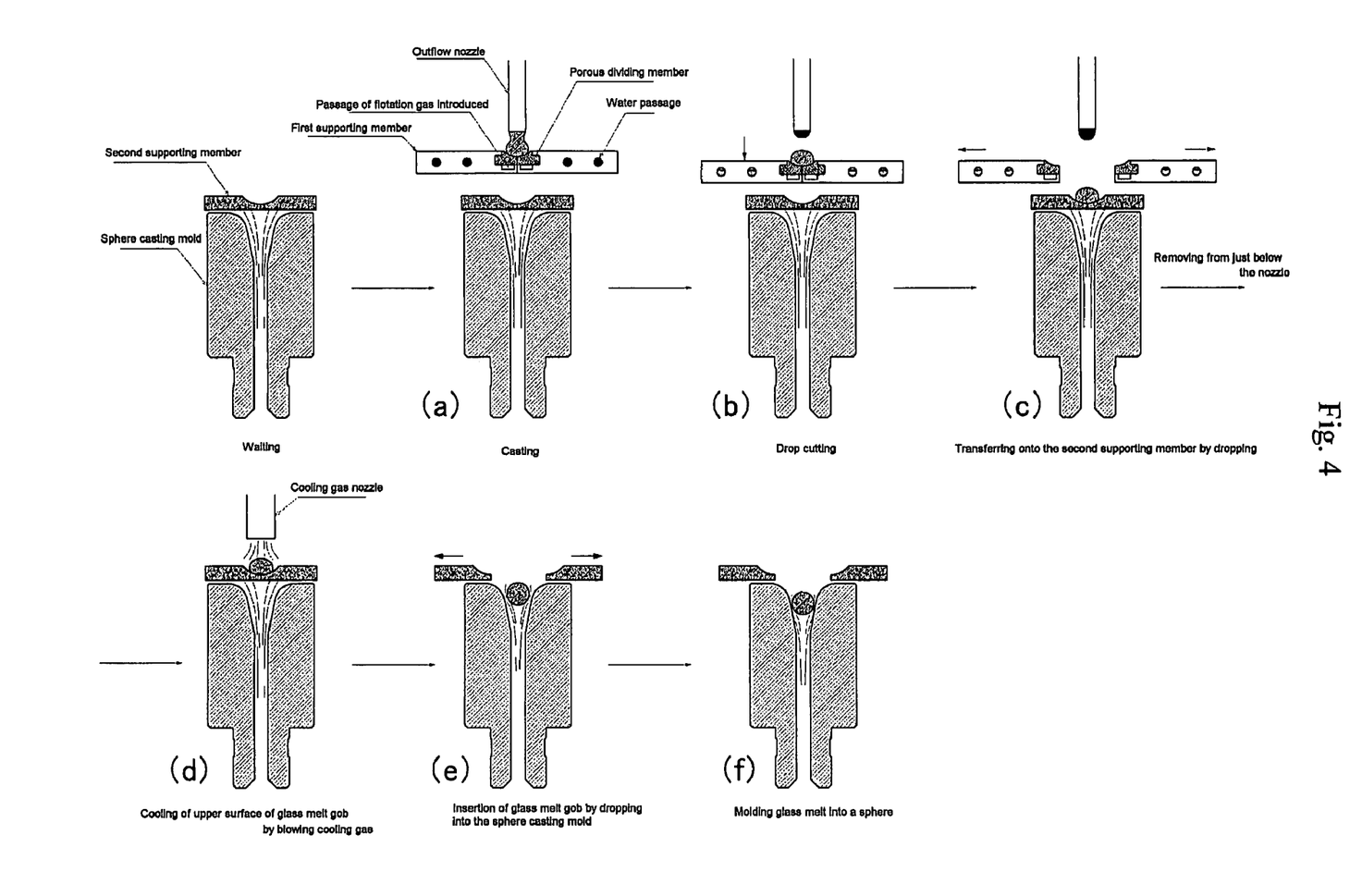
FIG. 4 is a schematic diagram of the device employed in Embodiment 9.

FIG. 4

Preforms for press molding were manufactured using the device shown in FIG. 4.

A first supporting member (dividing members) was positioned just below the outflow nozzle. Twelve sphere casting molds were positioned along the perimeter of a molding table such as that shown in FIG. 3, and just above it, each second supporting member (dividing members) was positioned close to it. The first supporting member was used to constantly cut glass melt by dropping, so a water cooling mechanism was built in to prevent fusion due to the elevated temperature. Since the second supporting member was used to increase the viscosity of the glass melt gob by holding the glass melt gob by flotation for a short period on the sphere casting mold, the glass melt was supported for a short period on the second supporting member. Therefore, no water cooling mechanism was built in the second supporting member. However, although not shown in FIG. 4, gas flow passages through which flotation gas was blown were built into the second supporting member.

First, the front end of the glass melt flow was supported with the first supporting member. Next, the first supporting member was dropped and glass melt gobs were separated one after another (FIGS. 4(a) and (b)). The first supporting member (dividing members) was separated to drop the glass melt gob onto the second supporting member (FIG. 4(c)). The type of glass and flow conditions employed were identical to those in Embodiment 7. The second supporting member on which the glass melt gob was being held by flotation was withdrawn from just below the nozzle, after which cooling gas was blown from just above the glass flow to increase the viscosity of the glass melt (FIG. 4(d)). Next, the second supporting member (dividing members) was separated to insert the glass melt gob into the sphere casting mold by dropping (FIG. 4(e)), and molding of the glass melt into a sphere was begun (FIG. 4(f)). Since the second supporting member was constantly positioned above the casting mold, the timing of the separation of the second supporting member (dividing members) could be freely determined. Thus, when striae or bubbles were observed in the molded preforms, the separation timing could be delayed or the flow rate of the cooling gas from above could be increased to inhibit them (the cooling flow rate was 3 to 10 L/min, and the timing of the separation in the present embodiment was 2 s). However, when the separation timing was excessively delayed, molding into a sphere became difficult and the preform became irregular. Thus, the separation timing should be suitably optimized. Further, the timing of the flotation gas to the first supporting member also should be optimized based on the conditions. When the glass melt has an outflow viscosity of about 4 dPa·s as the glass melt in the present embodiment, delaying the timing of flowing the flotation gas to just prior to separation of the first supporting member (dividing members) can prevent the generation of bubbles and striae in the course of drop insertion onto the second supporting member.

The above operation was repeated each 2.6 s and glass melt flowing out was continuously molded into 146 mm³ (553 mg) spherical preforms. No bubbles or striae were observed in the spherical preforms molded, and the shape thereof was good.

Based on the present invention, high-quality preforms for press molding and optical elements can be mass produced with good productivity from glass melt.

What is claimed is:

1. A method for manufacturing preforms for press molding in which a glass melt gob is separated from glass melt flow flowing out of a pipe and said glass melt gob is molded into a preform for press molding on a glass gob casting mold, comprising the steps of:

receiving a front end of said glass melt flow on a glass receiving surface of a supporting member positioned beneath said pipe, said supporting member having a plurality of gas-blowing holes arranged on the glass receiving surface, dropping said supporting member downward to separate a glass melt gob from said glass melt flow, and transferring said glass melt gob onto the glass gob casting mold to conduct a molding step, wherein during a period from when the front end of said glass melt flow is received on the glass receiving surface of the supporting member in said receiving step to when said glass melt gob is transferred onto the glass gob casting mold in said transferring step, the period being in a range from 3 seconds to 20 seconds, said glass melt is supported in a state of contact with said glass receiving surface of said supporting member and heat of said glass melt is removed with thermal conduction to increase viscosity of said glass melt in a viscosity-increasing step, and following increasing viscosity said glass melt, an operation in which said glass melt is floated on said supporting member is conducted, and wherein said supporting member is comprised of multiple dividing members capable of separating and joining together in a cross direction;

with said dividing members in a joined state, the glass melt supported is held for a prescribed period in a state of contact with a surface of said supporting member; and while said glass melt is in contact with said surface of said supporting member, gas flow is initiated from said gas-blowing holes on the glass receiving surface of said supporting member to float said glass gob, after which said dividing members are separated from each other to drop said glass gob vertically to transfer said glass gob onto said casting mold.

2. The method for manufacturing preforms for press molding of claim 1, wherein gas is blown from a surface of said supporting member to float said glass melt gob.

3. The method for manufacturing preforms for press molding of claim 1, wherein said supporting member is comprised of a first supporting member and a second supporting member positioned beneath the first supporting member, said receiving step and said dropping step are conducted on the first supporting member, following said dropping step, the glass melt gob is transferred onto the second supporting member and held for a prescribed period on the second supporting member to increase viscosity of said glass melt gob in a viscosity-increasing step; and following said viscosity-increasing step, said glass gob is transferred from said second supporting member onto said glass gob casting mold.

4. The method for manufacturing preforms for press molding of claim 3, in which said viscosity-increasing step is conducted on said second supporting member while floating said glass melt gob.

5. The method for manufacturing preforms for press molding of claim 3, wherein said first supporting member is comprised of multiple dividing members capable of separating and joining together in a cross direction;

with said dividing members in a joined state, the glass melt gob is held for a prescribed period on a surface of said first supporting member; and while said glass melt is in contact with said surface of said first supporting member, gas flow is initiated from at least a portion of the surface of said first supporting member to float said glass gob, after which said dividing members are separated from each other to drop said glass gob vertically to transfer said glass gob onto said second supporting member.

6. The method for manufacturing preforms for press molding of claim 1, wherein in said dropping step the glass melt gob is subject to a separating step in which said gob is separated from a front end of the glass melt flow flowing out of the pipe, and the method further comprises a molding step in which said glass melt gob is molded into a preform for press molding on a glass gob casting mold, wherein said separating step is conducted by supporting the front end of said glass melt flow with said supporting member positioned beneath said pipe, and then the glass melt gob is separated from the glass melt flow by dropping said supporting member downward;

said glass melt gob separated is held for a prescribed period on said supporting member in a state of contact with said supporting member to increase viscosity of said glass melt gob in a viscosity-increasing step;

multiple supporting members are sequentially employed to conduct said separating step and said viscosity-increasing step; and following said viscosity-increasing step, the glass gob on the supporting member that has been employed in said viscosity-increasing step is transferred onto said casting mold to mold into a preform for press molding.

7. The method for manufacturing preforms for press molding of claim 6, wherein said glass melt is supported on said supporting member in a floating state, or is floated after contacting with said supporting member.

8. The method for manufacturing preforms for press molding of claim 6, wherein said supporting member is comprised of multiple dividing members capable of separating and joining together in a cross direction;

with said dividing members in a joined state, the glass melt supported is held for a prescribed period in a state of contact with a surface of said supporting member; and while said glass melt is in contact with said surface of said supporting member, gas flow is initiated from at least a portion of the surface of said supporting member to float said glass gob, after which said dividing members are separated from each other to drop said glass gob vertically to transfer said glass gob onto said casting mold.

9. The method for manufacturing preforms for press molding of any of claims 1, 3 and 6, wherein, in said molding step, said glass melt gob is molded into a preform for press molding while being floated.

10. The method for manufacturing preforms for press molding of claim 9, wherein said casting mold comprises a concave portion and a gas blow hole in a bottom of the concave portion, gas is blown upward through said gas blow hole, said glass melt gob is dropped into said concave portion, and said glass melt gob is rotated with wind pressure from the gas that is blown to mold said glass melt gob into a spherical shape.

11. The method for manufacturing preforms for press molding of any of claims 1, 3 and 6, wherein viscosity of said glass melt flow flowing out of the pipe is less than or equal to 10 dPa s.

12. The method for manufacturing preforms for press molding of any of claims 1, 3 and 6, wherein said viscosity-increasing step is conducted until viscosity of said glass melt gob reaches 20 to 200 dPa·s.

13. A method for manufacturing optical elements, wherein the preform manufactured by the method of any of claims 1, 3 and 6 is heated and precision press molded to obtain an optical element.

14. The method for manufacturing preforms for press molding of claim 1, wherein said glass melt gob is transferred onto the glass gob casting mold by dropping the glass gob onto the glass gob casting mold.

15. The method for manufacturing preforms for press molding of claim 14, wherein, in the transferring step, a distance of the dropping of said glass melt gob from the supporting member to the casting mold is less than or equal to 30 mm.

16. The method for manufacturing preforms for press molding of claim 14, the supporting member from which said glass melt gob drops is less than or equal to 20 mm in thickness.

* * * * *